(12) United States Patent
Maye (10) Patent No.: US 12,361,182 B2
(45) Date of Patent: *Jul. 15, 2025

(54) METHOD FOR EARPIECE DESIGN VIA MISFIT PARAMETERS

(71) Applicant: GN Hearing A/S, Ballerup (DK)

(72) Inventor: Vincent Maye, St Louis Park, MN (US)

(73) Assignee: GN HEARING A/S, Ballerup (DK)

( * ) Notice: Subject to any disclaimer, the term of this patent is extended or adjusted under 35 U.S.C. 154(b) by 12 days.

This patent is subject to a terminal disclaimer.

(21) Appl. No.: 17/368,746

(22) Filed: Jul. 6, 2021

(65) Prior Publication Data

US 2021/0334419 A1 Oct. 28, 2021

(51) Int. Cl.
*G06F 30/10* (2020.01)
*G06F 111/16* (2020.01)
*H04R 25/00* (2006.01)

(52) U.S. Cl.
CPC .......... *G06F 30/10* (2020.01); *G06F 2111/16* (2020.01); *H04R 25/652* (2013.01); *H04R 2225/77* (2013.01)

(58) Field of Classification Search
CPC ...... G06F 30/10; G06F 30/20; G06F 2111/16; H04R 31/00; H04R 25/652; H04R 2225/77
See application file for complete search history.

(56) References Cited

U.S. PATENT DOCUMENTS

| | | | | |
|---|---|---|---|---|
| 8,032,337 B2 * | 10/2011 | Deichmann | .......... | H04R 25/652 703/2 |
| 9,706,282 B2 * | 7/2017 | Burgett | ................ | H04R 1/1016 |
| 11,049,331 B2 * | 6/2021 | Kinsella | .................. | G06F 30/00 |
| 2004/0107080 A1 | 6/2004 | Deichmann et al. | | |
| 2006/0239483 A1 * | 10/2006 | Orts | ...................... | H04R 25/652 381/312 |
| 2010/0296664 A1 | 11/2010 | Burgett et al. | | |
| 2011/0082519 A1 * | 4/2011 | Strahl | ................ | A61N 1/37247 607/57 |

(Continued)

FOREIGN PATENT DOCUMENTS

| | | |
|---|---|---|
| EP | 3879852 | 9/2021 |
| WO | WO 2007/087633 | 8/2007 |
| WO | WO 2011/046508 | 4/2011 |

OTHER PUBLICATIONS

Kinsella, P. "Analysis and Design of In-ear Devices" Thesis, Swinburne U. of Tech. (2018) available at <https://researchbank.swinburne.edu.au/file/5f28baf2-ffdb-4e35-bb9f-ae3390f00ff4/1/philip_kinsella_thesis.pdf> (Year: 2018).*

(Continued)

*Primary Examiner* — Jay Hann (74) *Attorney, Agent, or Firm* — Vista IP Law Group, LLP (57) ABSTRACT

A method of designing an earpiece for a user, includes: obtaining 3D scan data of an ear; obtaining a model earpiece with an earpiece configuration based on the 3D scan data; determining coupling data indicative of a coupling of the model earpiece, the coupling data including misfit data including one or more misfit parameters; evaluating the earpiece configuration based on the misfit data; and determining information regarding a personalized earpiece based on a result from the act of evaluating the earpiece configuration.

16 Claims, 3 Drawing Sheets

(56) References Cited

U.S. PATENT DOCUMENTS

| | | |
|---|---|---|
| 2011/0290005 A1 | 12/2011 | Hart et al. |
| 2013/0182882 A1 | 7/2013 | Hart et al. |
| 2015/0382123 A1 | 12/2015 | Jobani |
| 2020/0302099 A1 | 9/2020 | Grenier et al. |
| 2021/0334439 A1* | 10/2021 | Krull .................... H04R 25/658 |
| 2022/0070596 A1* | 3/2022 | Dahl ...................... H04R 25/30 |
| 2023/0039728 A1 | 2/2023 | Shonibare et al. |

OTHER PUBLICATIONS

Technical examination report for Danish patent application No. PA 2021 70466 dated Dec. 16, 2021.
Technical examination report for Danish patent application No. PA 2021 70465 dated Dec. 16, 2021.
Non-Final Office Action for U.S. Appl. No. 17/367,293 dated May 23, 2024.
Notice of Allowance for U.S. Appl. No. 17/367,293 dated Oct. 11, 2024.

* cited by examiner

METHOD FOR EARPIECE DESIGN VIA MISFIT PARAMETERS

FIELD

The present disclosure relates to a hearing device and related methods including a method for designing an earpiece, such as via one or more misfit parameters.

BACKGROUND

In the field of hearing devices, fit of components of the hearing devices, such as earpieces, is important. Providing a user with a poorly fitting earpiece can waste time, both of the user and the manufacturer, as well as providing negative feedback to the user. Further, as newer earpiece designs are tailored specifically to a given user, a poorly fitting earpiece may be wasted.

Accordingly, there is a need for methods for better predicting earpiece designs for consumer fit.

SUMMARY

A method of designing an earpiece for a user is disclosed. The method can be performed via one or more earpiece misfit parameters. The method can comprise obtaining 3D scan data of an ear. The method can include obtaining a model earpiece with an earpiece configuration. The model earpiece can be based on the 3D scan data. The method can include determining coupling data indicative of a coupling of the model earpiece. The coupling data can include misfit data. The misfit data can include one or more earpiece misfit parameters. The method can include evaluating the earpiece configuration. The evaluating can be performed based on the misfit data. The method can include providing a personalized earpiece based on an output of the evaluation.

Also disclosed is an electronic device comprising one or more processors, memory, and an interface, wherein the one or more processors are configured to obtain 3D scan data of an ear; obtain a model earpiece with an earpiece configuration, e.g. based on the 3D scan data; determine coupling data indicative of a coupling of the model earpiece, the coupling data including misfit data including one or more earpiece misfit parameters; evaluate the earpiece configuration based on the misfit data; and optionally provide a personalized earpiece based on an output of the evaluation.

The present disclosure provides for methods and devices for designing an earpiece, such as for a hearing device, proactively to reduce or eliminate negative user feedback. Thus, one or more exemplary methods can take remedial action to increase the probability of a good physical fit prior to releasing an earpiece design to manufacturing, e.g. prior to a user wearing the earpiece. Accordingly, one or more exemplary methods can assign products with high probability of physical fit to one or more technicians to improve fitting prior to providing it to a user.

For example, the method can provide for a method which can analyze a set of archived data of earpieces. The archived data can include data, e.g. labels, that indicate whether the earpiece had proper fit, or had otherwise problematic fitting, for certain users. By comparing certain parameters to that of the archived data, probabilities can be determined for different categories or parameters for a given earpiece. Further, if an earpiece may be considered an ill-fit, iterative processing can occur to provide for an earpiece with a higher likelihood of fit.

The probabilistic determination of fit via the disclosed method(s) can greatly improve the likelihood of earpiece fit, thus reducing customer misfit and the substantial issues that come from the misfit. This can improve the happiness of the consumer, and also reduce manufacturing costs by reducing the likelihood of waste of a given earpiece. Further, one or more exemplary methods can reduce wasted time by a technician in producing an earpiece that is likely not to fit a user.

A method of designing an earpiece for a user, includes: obtaining 3D scan data of an ear; obtaining a model earpiece with an earpiece configuration based on the 3D scan data; determining coupling data indicative of a coupling of the model earpiece, the coupling data including misfit data including one or more misfit parameters; evaluating the earpiece configuration based on the misfit data; and determining information regarding a personalized earpiece based on a result from the act of evaluating the earpiece configuration.

Optionally, the act of evaluating the earpiece configuration based on the misfit data comprises determining if the misfit data satisfy one or more misfit criteria.

Optionally, the method further includes labelling the model earpiece with a misfit label indicative of misfit if a misfit criterion is satisfied.

Optionally, the one or more misfit parameters includes a first misfit parameter indicative of a first probability that the model earpiece is too protruding, too tight, or too loose.

Optionally, the one or more misfit parameters includes: a first misfit parameter indicative of a first probability that the model earpiece is too protruding; a second misfit parameter indicative of a second probability that the model earpiece is too tight; and a third misfit parameter indicative of a third probability that the model earpiece is too loose.

Optionally, the act of evaluating the earpiece configuration based on the misfit data comprises determining whether a misfit label indicative of misfit is present.

Optionally, if the misfit label is present, the method further includes: updating the model earpiece to a secondary model earpiece; determining secondary coupling data indicative of a coupling of the secondary model earpiece, the secondary coupling data including secondary misfit data including one or more secondary misfit parameters; and evaluating an earpiece configuration of the secondary model earpiece based on the secondary misfit data.

Optionally, the information regarding the personalized earpiece is based on a result from the act of evaluating the earpiece configuration of the secondary model earpiece.

Optionally, the act of evaluating the earpiece configuration based on the misfit data comprises determining whether a misfit label indicative of misfit is present; wherein the output of the evaluation includes a fit label indicative of fit, if the misfit label is not present.

Optionally, the act of evaluating the earpiece configuration based on the misfit data comprises determining whether a misfit label indicative of misfit is present; wherein the output of the evaluation includes a misfit label indicative of misfit, if the misfit label is present.

Optionally, the method is performed prior to providing an initial earpiece to the user.

Optionally, the 3D scan data is based on a 3D scan of an impression of the ear.

Optionally, the 3D scan data is based on a 3D scan of the ear.

Optionally, the 3D scan data comprises front pinna data, back pinna data, and ear canal data.

An electronic device includes one or more processors, memory, and an interface, wherein the one or more processors are configured to: obtain 3D scan data of an ear; obtain a model earpiece with an earpiece configuration based on the 3D scan data; determine coupling data indicative of a coupling of the model earpiece, the coupling data including misfit data including one or more misfit parameters; evaluate the earpiece configuration based on the misfit data; and determine information regarding a personalized earpiece based on an output of the evaluation.

Optionally, the information regarding the personalized earpiece may include geometric data indicating a shape and/or dimension(s) of one or more parts of the personalized earpiece, and/or any data that can be used to define and/or to make the personalized earpiece or part(s) thereof.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Methods for predicting an earpiece and/or hearing device design are disclosed herein. Further, devices configured to utilize one or more exemplary methods are disclosed herein.

The earpiece may be a component of a hearing device, and vice versa. The hearing device may be configured to be worn at an ear of a user and may be a hearable or a hearing aid, wherein the processing unit is configured to compensate for a hearing loss of a user.

The hearing device may be of the behind-the-ear (BTE) type, in-the-ear (ITE) type, in-the-canal (ITC) type, receiver-in-canal (RIC) type, receiver-in-the-ear (RITE) type, or microphone-and-receiver-in-the-ear (MaRie) type. The hearing aid may be a binaural hearing aid.

The hearing device may be configured for wireless communication with, e.g. reception of wireless signals from and/or transmission of wireless signals, such as control signals, to one or more devices, such as with another hearing device, e.g. as part of a binaural hearing system, and/or with one or more accessory devices, such as a smartphone and/or a charging device and/or a smart watch. The hearing device optionally comprises an antenna for converting one or more wireless input signals, e.g. a first wireless input signal and/or a second wireless input signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more accessory devices.

The hearing device optionally comprises a wireless transceiver or radio transceiver e.g. also denoted or forming part of magnetic induction unit, coupled to the antenna (e.g. as part of the magnetic induction unit) for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device optionally comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal. The set of microphones may provide one or more input signals to the processing unit. The processing unit may process input signal(s) from the one or more microphones and/or optionally a radio transceiver. The processing unit may provide an output signal to a receiver, such as an output transducer, for conversion to an audio output signal.

The hearing device comprises a processing unit for processing input signals, such as (optionally pre-processed) transceiver input signal(s) from magnetic induction unit and/or (optionally pre-processed) microphone input signal(s) from the microphone(s). The processing unit is optionally configured to compensate for hearing loss of a user of the hearing device. The processing unit provides an electrical output signal based on the input signals to the processing unit.

Disclosed herein are methods for designing an earpiece, such as an earpiece for a hearing device as discussed above. Producing earpieces for use in a hearing device for a user can be a long and time consuming process. This process typically can include one or more fittings of a user to develop a proper fitting earpiece created by a technician. This can waste significant time and resources for both the user and the technician. Further, a user can be frustrated in having to come to a hearing aid specialist facility a number of times, only to have the earpieces not fit well.

Accordingly, it can be advantageous to filter out likely poor fitting earpieces prior to investing time and effort into producing an earpiece for a user, and prior to any fitting of the user. Accordingly, disclosed herein are one or more exemplary methods which use information about a user to produce an earpiece with a high probability of fitting. Specifically, one or more exemplary methods can utilize a database of previously used and/or known earpieces to determine, and therefore assist in producing, an earpiece with a high likelihood of fitting a user. In particular, one or more earpiece misfit parameters can be determined and evaluated for producing an earpiece.

Advantageously, all or part of the of the disclosed method can be performed prior to providing an initial earpiece to the user. Thus, a user will likely not have to come to multiple fittings to properly receive an earpiece and hearing device or at least the number of visits for fitting or fitting sessions will be heavily reduced. One or more of the disclosed methods can use parameters, as discussed below, to prepare an earpiece having a high likelihood of fitting the user. While iteration may be needed, it can all be performed without a user being required to fit. In one or more exemplary methods, the first earpiece a user receives will properly fit the user. In one or more exemplary methods, only minor adjustments may be needed to fit an earpiece to a user.

Alternatively, in one or more exemplary methods, all or part of the disclosed method can be performed while using one or more fittings with a user. This still may reduce the number of fittings required by the user as compared to standard techniques. For example, one or more exemplary methods can use 0, 1, 2, 3, 4, or 5 fittings. In one or more exemplary methods, the method can use less than 1, 2, 3, 4, or 5 fittings. In one or more exemplary methods, the method can use greater than 0, 1, 2, 3, 4, or 5 fittings.

In one or more exemplary methods, an analysis can be performed on a user. The analysis can include modeling, such as via one or more procedures of the user. The procedure can include one or more scans. For example, one or more scans can be performed on a user's ear. In one or more exemplary methods, a 3D scan can be performed on an ear of a user. However, the particular scan is not limiting, and other scans can be used as well. The one or more scans can be used to determine data on a user's ear such as, for example, shape, size, dimensions, proportions, relationships of components.

The 3D scanning can be performed on one or more parts of the user. The 3D scanning can be performed on the user's ear to obtain 3D scan data. The 3D scanning can be performed on the user's head to obtain 3D scan data. The 3D scanning can be performed on the user's ear and head to obtain 3D scan data. In one or more exemplary methods, the 3D scan data can include front pinna data. The front pinna data may be indicative of one or more features of the pinna, such as a pinna surface or pinna surface properties. In one or more exemplary methods, 3D scan data can include back pinna data. In one or more exemplary methods, 3D scan data can include ear canal data. In one or more exemplary methods, the 3D scan data can include back pinna data, front pinna data, and ear canal data. In one or more exemplary methods, the 3D scan data can include back pinna data and/or front pinna data and/or ear canal data.

The 3D scan data can include more of the user than just the ear. For example, the 3D scan data can include further data on the user's head, such as the user's jaw and/or hair and/or skull and/or nose.

The 3D scan data can be obtained through a number of methods. In one or more exemplary methods, 3D scan data can be obtained by performing a 3D scan on the ear of a user. Accordingly, the 3D scan can be performed directly on the user.

In one or more exemplary methods, 3D scan data can be obtained by performing a 3D scan on an impression of the ear of a user. Thus, an ear impression of the user can be manufactured first. From the ear impression, a 3D scan can be taken. In one or more exemplary methods, the method can determine if an impression is properly or not properly representative of ear anatomy. For example, the method can compare the impression to a database. In other words, one or more misfit parameters may be based on the ear impression, e.g. via a comparison of the ear impression with a database, e.g. of ear models representative of the anatomy of the ear canal.

In one or more exemplary methods, the 3D data can be obtained via receiving the data from the user. For example, the user can electronically or physically provide the 3D data. Alternatively, a facility that previously performed a 3D scan, whether of the patient's ear directly or on an impression of the patient's ear, can be provided by the facility.

Thus, in one or more exemplary methods, the method can include performing a 3D scan to obtain 3D scan data of the user's ear and/or head. Alternatively, the method can include receiving 3D scan data on the user's ear and/or head without performing the actual 3D scan.

In one or more exemplary methods, the method can include obtaining a model earpiece. The model earpiece can include an earpiece configuration. The model earpiece can be configured for a hearing device. The earpiece configuration can be based on the 3D scan data. The earpiece configuration can be based fully on the 3D scan data. The earpiece configuration can be based partially on the 3D scan data.

The model earpiece can be a physical earpiece. The model earpiece can be a digital earpiece. For example, a data representation of the model earpiece can be stored and/or configured for transmission. The model earpiece may be configurable to be modified, such as by a technician or other user. The model earpiece can include some or all physical parameters of the model earpiece, such as size, shape, dimensions, etc.

Once a model earpiece has been obtained, one or more exemplary methods can include determining coupling data. The coupling data can be indicative of a coupling, e.g. comfort, insertion, feel, fit, misfit, attachment, holding, retaining of the model earpiece. In particular, the coupling data can be indicative of a coupling of the model earpiece in and/or around a user's ear. The coupling data can be used to determine whether there is a likelihood, e.g. probability, of the earpiece fitting or not fitting the user as discussed below.

The coupling data can include, for example, misfit data. The misfit data can include one or more misfit parameters. The misfit data and/or the misfit parameters may be indicative of misfit and/or fit of the model earpiece. The misfit data and/or the misfit parameters may be indicative of one or more probabilities of misfit and/or fit of the model earpiece. Thus, the coupling data and/or the misfit data can be representative of whether it would be likely that a given model earpiece would fit or not fit a user.

The misfit parameters may be representative of one or more probabilities of fit and/or misfit. In one or more exemplary methods, the one or more misfit parameters includes a first misfit parameter indicative of a first probability that the model earpiece is a misfit of a first type selected from too protruding, too tight, and too loose. In one or more exemplary methods, the one or more misfit parameters includes a first misfit parameter indicative of a first probability that the model earpiece is a misfit of a first type selected from too protruding and/or too tight and/or too loose. In one or more exemplary methods, the one or more misfit parameters can be selected from a set of misfit types. The set of misfit types may include one or more misfit types, such as a plurality of misfit types.

For example, the misfits, e.g. misfit parameters and/or misfit data, of being too protruding, too tight, or too loose are three useful fitting guidelines for a user. However, other fitting guidelines can be used, and the disclosure should not be limited to just these three.

Many users would like their earpieces to be as unnoticed as possible by others. Therefore, it can be advantageous for the earpiece to minimally protrude away from the user's ear. If the earpiece were to protrude too fair, a user may not approve of the aesthetics of the earpiece. Thus, the misfit parameter indicative of a model earpiece being too protruding would be advantageous to know prior to providing an earpiece to a user.

Additionally, a user does not want to have their earpiece to be too tight, causing pain or discomfort to the user. Further, a user does not want their earpiece to be too loose, which may reduce the overall effectiveness of the earpiece and/or hearing aid, and may allow for the earpiece to fall out of a user's ear. Thus, the misfit parameter indicative of a model earpiece being too tight would be advantageous to know prior to providing an earpiece to a user. Further, the misfit parameter indicative of a model earpiece being too loose would be advantageous to know prior to providing an earpiece to a user.

As mentioned, the misfit data may include one or more earpiece misfit parameters. The misfit data can include further information as well, and is not merely limited to the earpiece misfit parameters.

In one or more exemplary methods, a first misfit parameter may be indicative of a first probability that the model earpiece is too protruding. In one or more exemplary methods, a second misfit parameter can be indicative of a second probability that the model earpiece is too tight. In one or more exemplary methods, a third misfit parameter can be indicative of a third probability that the model earpiece is too loose.

In one or more exemplary methods, a first misfit parameter may be a first probability that the model earpiece is too protruding. In one or more exemplary methods, a second misfit parameter can be a second probability that the model earpiece is too tight. In one or more exemplary methods, a third misfit parameter can be a third probability that the model earpiece is too loose.

In one or more exemplary methods, the first and second misfit parameters can be used. In one or more exemplary methods, the first and third misfit parameters can be used. In one or more exemplary methods, the second and third misfit parameters can be used. In one or more exemplary methods, the first misfit parameter can be used. In one or more exemplary methods, the second misfit parameter can be used. In one or more exemplary methods, the third misfit parameter can be used. In one or more exemplary methods, the first, the second, and the third misfit parameters can be used.

Further or alternative misfit parameters can be used. These further or alternative misfit parameters can be included in the misfit data.

The coupling data, such as the misfit data and/or the misfit parameters, can be determined via a number of different processes, none of which are limiting to the disclosure.

In one or more exemplary methods, the method can access a database, e.g. archive, list, data, analysis, set, table, of known earpieces. The database can include earpiece data regarding a plurality of known earpieces. This earpiece data can include, for example, the dimensions of the plurality of known earpieces and/or different components of the earpiece. Further, the database can include user results and/or comments and/or data regarding a user's analysis of a particular earpiece. Moreover, the database can include ear and/or head dimensions and data for users with their particular earpieces. The earpiece data can further include data on particular user(s) which have used the particular earpiece.

Accordingly, the database can include a data representation of which earpieces may fit properly with particular user dimensions. The database can then be accessed by the method with the model earpiece, which is based on the 3D scan data of the user's ear and/or head. In one or more exemplary methods, the database can be accessed to determine a subset of the database earpieces which are similar to those of the user based on the 3D scan data. Machine learning or artificial intelligence can be used to make such determinations.

Thus, the method may utilize the model earpiece to determine a subset of earpieces from the database which would likely fit a user based on the coupling data, in particular the one or more earpiece misfit parameters.

For example, the database can be accessed to determine a subset of the database earpieces which have had positive fit for users having larger ear canals if the user has a large ear canal. The database can be accessed to determine a subset of the database earpieces which have had positive fit for users having smaller ear canals. The database can be accessed to determine a subset of the database earpieces which have had positive fit for users having larger and/or smaller front pinna and/or back pinna. These are merely some examples, as the 3D scan data would include a variety of different ear and head parameters of the user which can be compared to the database.

Thus, the model earpiece can be compared to the plurality of earpieces in the database. Specifically, the coupling data of the model earpiece can be compared to coupling data of the earpieces in the database. As discussed below, based on the comparison the method may proceed with the particular model earpiece or may modify the model earpiece for a potentially better fit.

In one or more exemplary methods, machine learning can be used to analyze and compare the model earpiece to the earpieces in the database. In one or more exemplary methods, artificial intelligence can be used to analyze and compare the model earpiece to the earpieces in the database.

Based on the comparison, the method can determine the misfit data including the one or more earpiece misfit parameters. For example, the method can determine the first misfit parameter and/or the second misfit parameter and/or the third misfit parameters and/or any other misfit parameters.

In one or more exemplary methods, the first and/or second and/or third misfit parameter(s) and/or the misfit data be compared to a criteria. In one or more exemplary methods, the first and/or second and/or third misfit parameter(s) and/or misfit data be compared to a threshold.

The criteria can be a particular probability of misfit. For example, the criteria can be a probability of misfit of 10, 20, 30, 40, 50, 60, 70, 80, 90, 95, or 100%. The criteria can be a probability of misfit of greater than 10, 20, 30, 40, 50, 60, 70, 80, 90, 95, or 100%. The criteria can be a probability of misfit of less 10, 20, 30, 40, 50, 60, 70, 80, 90, 95, or 100%. Thus, in one or more exemplary methods, the criteria can be indicative a probability, e.g. confidence, that an earpiece may fit a user for a given coupling data and/or misfit data and/or misfit parameter.

Thus, for example, a criterion of 70% for a criterion of too loose may indicate that there would be a 70% chance that a given model earpiece would be too loose. Alternatively, a criterion of 70% for a criterion of too loose may indicate that there would be a 30% chance that a given model earpiece would be too loose.

Each of the first and/or second and/or third misfit parameter(s) can have a separate criteria, such as a first criteria, a second criteria, or a third criteria, which may include the probabilities discussed above. For example, a protrusion misfit criteria may be higher than a too tight or too loss misfit criteria. In one or more exemplary methods, the first and/or second and/or third misfit parameter(s) may all have the same single criteria.

The criteria may be adjusted by either the provider of the earpiece or the user. For example, if the user finds protrusion to be more aesthetically acceptable, the method may adjust the criterion for too protruding. Moreover, the provider may determine that an earpiece being too tight may be more problematic than an earpiece being too loose, and therefore may adjust the respective criterion.

In one or more exemplary methods, if the misfit parameter is above a respective criteria for the misfit parameter, this may indicate a high likelihood that the model earpiece would not fit a given user.

For example, if the first misfit parameter is above the given criteria, the first misfit parameter may receive a misfit label indicative of misfit. If the second and third misfit parameters are below their respective criteria, they may receive a fit label indicative of fit. Alternatively, the second and third misfit parameters may not receive a label. Thus, they may merely not have a misfit label indicative of misfit.

Accordingly, for each misfit parameter, the misfit parameter is compared to the respective criteria as discussed above. If the misfit parameter is above the respective criteria, this indicates that there is a high likelihood of misfit. Thus, the misfit data and/or the particular misfit parameter would receive an indication, e.g. label, tag, data, indicative of misfit.

If the misfit parameter is below the respective criteria, this indicates that there is a high likelihood of fit. Thus, the misfit data and/or the particular misfit parameter would receive an indication, e.g. label, tag, data, indicative of fit. Alternatively, the misfit data and/or the particular misfit parameter would receive no indication, e.g. label, tag, data, indicative of misfit.

Further, labelling the model earpiece can include physically labelling the model earpiece. For example, the method can include attaching a sticker, e.g. label, attachment, tag, to the model earpiece. In one or more exemplary embodiments, the method can include putting the model earpiece into a designated container, e.g. box, packaging.

In one or more exemplary methods, the method can utilize one or more numerical equations. For example: $MCR\_1: FP\_1>TH\_1$.

Thus, the first misfit criterion $MCR\_1$ can be based on the first misfit parameter $FP\_1$ as compared to a first criterion and/or threshold $TH\_1$. The first misfit criterion $MCR\_1$ may be indicative of a first probability that the model earpiece is too protruding. The first misfit parameter $FP\_1$ may be a probability, such as a probability being indicative of a probability that the model earpiece exhibits a first type of misfit. The first type of misfit may be selected from too protruding, too tight, and too loose. A model earpiece may be too protruding when the model earpiece is determined to extend more than 1, 2, 3, 4, 5, 8, 7, 8, 9, 10, 15, or 20 mm from an opening in the ear canal. A model earpiece may be too protruding when the model earpiece is determined to extend less than 1, 2, 3, 4, 5, 8, 7, 8, 9, 10, 15, or 20 mm from an opening in the ear canal.

Similarly: $MCR\_2: FP\_2>TH\_2$.

Thus, the second misfit criterion $MCR\_2$ can be based on the second misfit parameter $FP\_2$ as compared to a second criterion and/or threshold $TH\_2$. The second misfit criterion $MCR\_2$ may be indicative of a second probability that the model earpiece is too tight. The second misfit parameter $FP\_2$ may be a probability, such as a probability being indicative of a probability that the model earpiece exhibits a second type of misfit. The second type of misfit may be selected from too protruding, too tight, and too loose. A model earpiece may be too tight when one or more points on the model earpiece are determined to be too close to the ear canal. For example, a model earpiece may be determined as too tight when a point on the model earpiece is less than 0 cm (for example a negative value) from a point on the ear canal adjacent to the point on the model earpiece. A model earpiece may be determined as too tight when a point on the model earpiece is less than 0.1, 0.2, 0.3, 0.4, 0.5, 0.6, 0.7, 0.8, 0.9, or 1 cm away from a point on the ear canal adjacent to the point on the model earpiece. The model can be configured to determine the distance from a single point or a plurality of points on the model earpiece.

Similarly: $MCR\_3: FP\_3>TH\_3$.

Thus, the third misfit criterion $MCR\_3$ can be based on the third misfit parameter $FP\_3$ as compared to a third criterion and/or threshold $TH\_3$. The third misfit criterion $MCR\_3$ may be indicative of a third probability that the model earpiece is too loose. The third misfit parameter $FP\_3$ may be a probability, such as a probability being indicative of a probability that the model earpiece exhibits a third type of misfit. The third type of misfit may be selected from too protruding, too tight, and too loose. A model earpiece may be too loose when one or more points on the model earpiece are determined to be too far from the ear canal. A model earpiece may be determined as too loose when a point on the model earpiece is greater than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2.0 cm away from a point on the ear canal adjacent to the point on the model earpiece. The model can be configured to determine the distance from a single point or a plurality of points on the model earpiece.

$TH\_1$, $TH\_2$, and $TH\_3$ may be different criteria and/or thresholds. Alternatively, they may be the same. In one or more exemplary methods, two of the criteria and/or thresholds may be the same.

In one or more exemplary methods, each of the misfit parameters may receive its own misfit label and/or fit label and/or lack of misfit label. Alternatively, the model earpiece as a whole may receive a misfit label and/or a fit label and/or a lack of misfit label.

For example, if the second misfit parameter is above the given criteria, the model earpiece as a whole may receive a misfit label indicative of misfit. Thus, if any of the misfit parameters are above the criteria, the model earpiece as a whole receives a misfit label. If all misfit parameters are below the criteria, the model earpiece as a whole receives a fit label.

In accordance with determining that a misfit criterion of the one or more misfit criteria is not satisfied, the method can include labelling the model earpiece with a fit label indicative of fit, or not labelling the model earpiece with a misfit label indicative of misfit.

In one or more exemplary methods, the method can include evaluating an earpiece configuration based on the misfit data, such as including one or more earpiece misfit parameters. This can include determining whether a misfit label indicative of misfit is present. In accordance with a determination that a misfit label is present, the method can include updating the model earpiece to a secondary model earpiece. Further, the method can include, in one or more example methods, determining secondary coupling data indicative of a coupling of the secondary model earpiece. The secondary coupling data can include secondary misfit data. The secondary misfit data can include one or more secondary earpiece misfit parameters. In one or more exemplary methods, the method can further include evaluating an earpiece configuration of the secondary model earpiece based on the secondary misfit data. The method can further include providing the personalized earpiece based on an output of the evaluation of the secondary model earpiece.

In one or more exemplary methods, the evaluating an earpiece configuration based on the misfit data comprises determining if the misfit data satisfy one or more misfit criteria.

In one or more exemplary methods, the evaluating an earpiece configuration based on the misfit data can include determining whether the misfit label indicative of misfit is present. In accordance with a determination that a misfit label is not present, the method can include outputting the output of the evaluation having a fit label indicative of fit.

In one or more exemplary methods, the evaluating an earpiece configuration based on the misfit data can include determining whether a misfit label indicative of misfit is present. In accordance with a determination that a misfit label is present, the method can include outputting the output of the evaluation having a misfit label indicative of misfit.

Accordingly, in one or more exemplary methods, after the coupling data including the misfit data has been determined via any of the above-disclosed processes, the earpiece configuration can be evaluated to determine whether there is a high probability of misfit. If there is a high probability of misfit, e.g., if one or more of the earpiece misfit parameters is above a particular criteria, the model earpiece is not provided to the user. This occurs because the model earpiece has been deemed unlikely to fit. Further, a technician would not be needed to be used to prepare the actual physical earpiece.

If the earpiece configuration has been evaluated to likely be a misfit, e.g. there is a misfit label, any data on the earpiece configuration can be entered into the database of earpieces, along with the particular 3D scan data of the user. For example, in accordance with determining that a misfit criterion of the one or more misfit criteria is satisfied, the method can include labelling the model earpiece with a misfit label indicative of misfit. This can improve the overall scope of the database, while further providing improvements and teachings to any machine learning. Thus, the method can include updating an earpiece data record, such as in the database, with the label and/or data indicative of the label.

In one or more example methods, the method can, in accordance with determining that at least two misfit criteria of misfit criteria are satisfied, include labelling the model earpiece with a misfit label indicative of misfit.

In one or more exemplary methods, as mentioned above when a label of misfit of the model earpiece has been found, the method can begin again with a secondary model earpiece. The secondary model earpiece can have a secondary configuration based on the 3D scan data of the user. The secondary model earpiece may have modified dimensions. The modified dimensions can be, for example, based on the database discussed above.

The method can then further include determining secondary coupling data indicative of a coupling of the secondary model earpiece, the secondary coupling data including secondary misfit data including one or more secondary earpiece misfit parameters. Further, the method can include evaluating the secondary earpiece configuration based on the secondary misfit data.

The above-disclosed method can repeat iteratively until a model earpiece having an earpiece configuration is found and evaluated that does not contain any misfit label. Accordingly, a third, fourth, fifth, sixth, seventh, eighth, nineth, or tenth model earpiece with a respective earpiece configuration based on the 3D scanned data can be obtained and evaluated. In one or more exemplary methods, more than 1, 2, 3, 4, 5, 6, 7, 8, 9, or 10 model earpieces can be evaluated.

In one or more exemplary methods, in accordance with the earpiece configuration being evaluated as fit the method can include providing a personalized earpiece based on an output of the evaluation. In one or more exemplary methods, the method may only proceed, e.g. be approved, to the providing a personalized earpiece if the particular earpiece configuration has no misfit label indicative of misfit. In one or more exemplary methods, the method may only proceed to the providing a personalized earpiece if the particular earpiece configuration includes a fit label indicative of fit.

In one or more exemplary methods, the model earpiece can be output. Thus, the output of the evaluation can be the model earpiece and/or the earpiece configuration and/or data representation of either. For example, the model earpiece can be output to a technician. The technician can then use the model earpiece to prepare a personalized earpiece for the user. The personalized earpiece can be a physical earpiece to be worn by a user, for example in conjunction with a hearing device. Advantageously, based on the above-discussed method, there is a high likelihood of fit for the personalized earpiece once produced and given to a user.

As discussed above, the personalized earpiece may be the first earpiece physically experienced by the user. If the personalized earpiece does not fit properly, the earpiece configuration and the 3D scan data of the user can be provided back into the database, such as for further machine learning, and another model earpiece can be produced.

In one or more exemplary methods, the methods can be performed via a physical device, such as a computer program product. The computer program product can be utilized in, for example, a computer, laptop, mobile phone, table, etc.

In one or more exemplary methods, the computer system can include a computer program product. The computer program product can include a non-transitory computer readable medium. The non-transitory computer readable medium can have thereon a computer program. The computer program can include program instructions. The computer program can be loadable into a data processing unit. The computer program can be configured to cause execution of the steps, processes, and/or modules discussed above. For example, when the computer program is run by a data processing unit.

Figure 1:
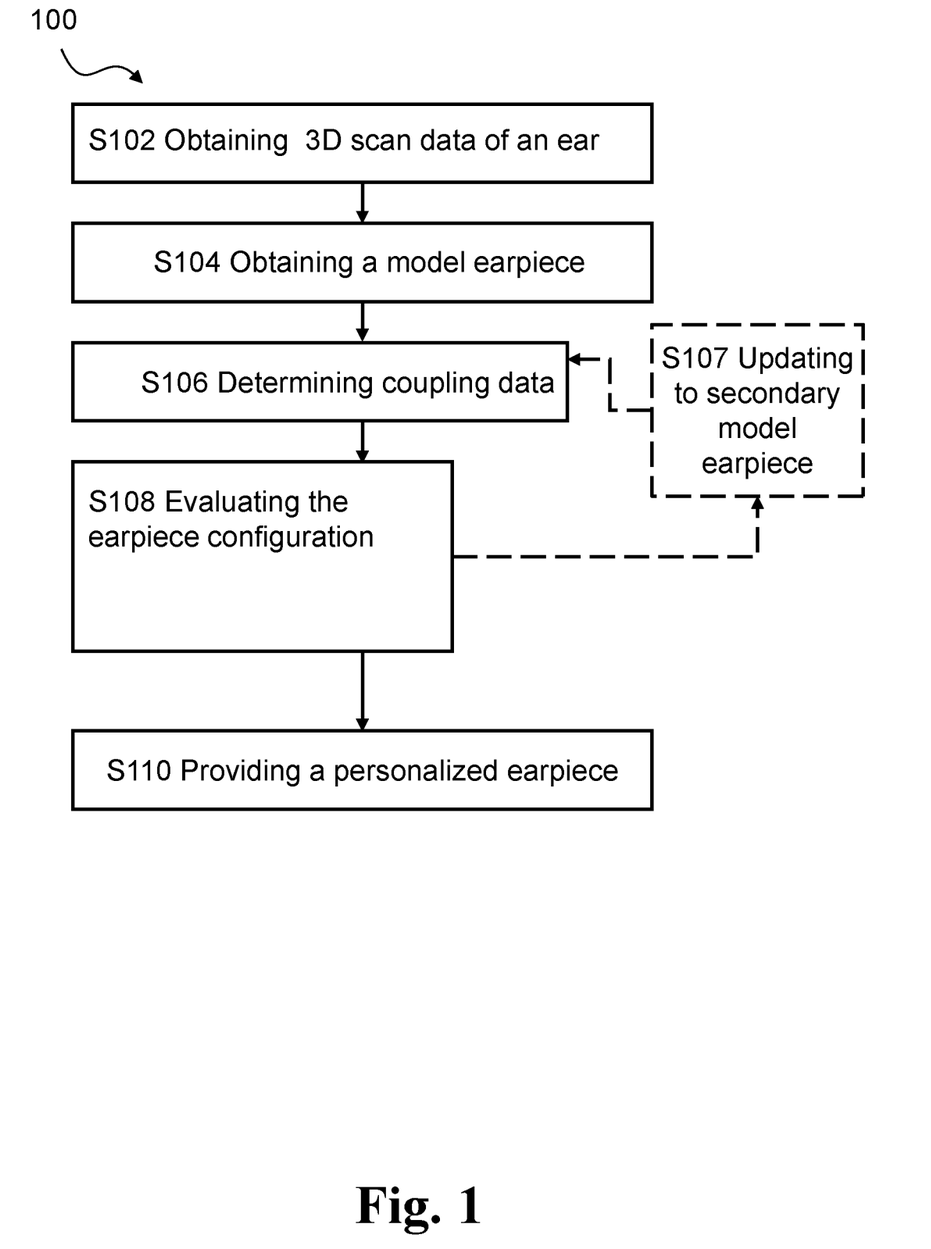
FIG. 1 illustrates an example method as disclosed herein.
Figure 2:
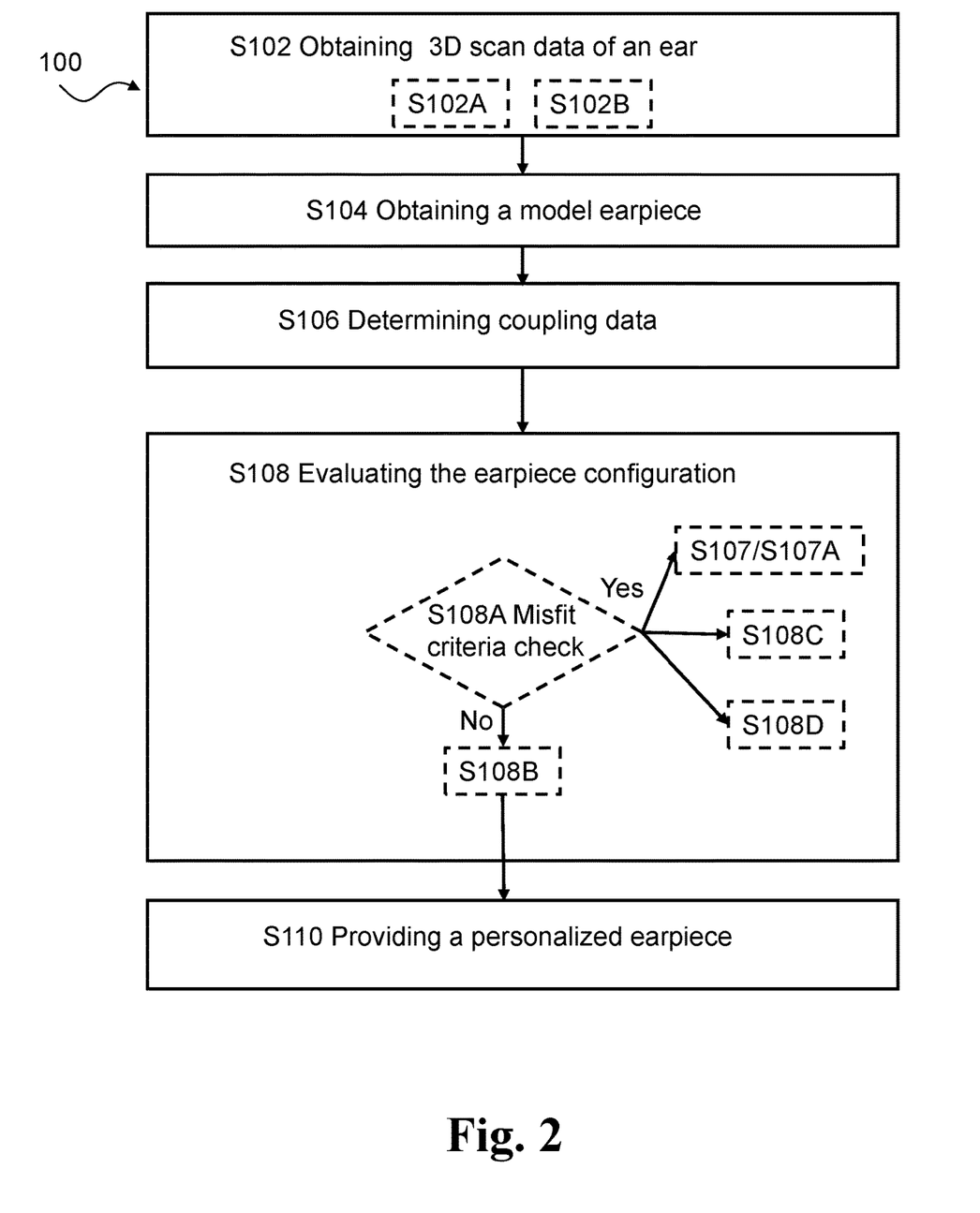
FIG. 2 illustrates an example method as disclosed herein.

FIG. 1 and FIG. 2 illustrate exemplary methods for designing an earpiece as disclosed herein. In particular, the figures illustrate a method 100 of designing an earpiece for a user via one or more earpiece misfit parameters.

As shown, the method 100 an include obtaining 3D scan data of an ear S102. The obtaining 3D scan data S102 can include performing a 3D scan on an impression of the ear S102A. Alternatively, the obtaining 3D scan data S102 can include performing a 3D scan on the ear S102B. The 3D scan data can include front pinna data, back pinna data, and ear canal data. Further, the method 100 can include obtaining a model earpiece with an earpiece configuration based on the 3D scan data S104.

Following, the method 100 can include determining coupling data indicative of a coupling of the model earpiece, the coupling data including misfit data including one or more earpiece misfit parameters S106.

After the determining S106, the method can include evaluating the earpiece configuration based on the misfit data S108. The evaluating an earpiece configuration based on the misfit data S108 includes determining if the misfit data satisfy one or more misfit criteria, e.g. a misfit criteria check S108A. For example, the evaluating an earpiece configuration based on the misfit data S108 can include determining whether a misfit label indicative of misfit 210 is present, and in accordance with a determination that a misfit label 210 is present, outputting the output of the evaluation having a misfit label indicative of misfit S108C. In certain methods, the method can include labelling the model earpiece with a misfit label indicative of misfit S108D.

If a misfit label 210 is found, the method 100 can include updating the model earpiece to a secondary model earpiece S107. Following, the method can include determining secondary coupling data S107A of the secondary model earpiece and the secondary earpiece can undergo the evaluation S108.

In accordance with a determination that a misfit label 210 is not present, or in accordance with a determination that a fit label indicative of fit 212 is present, the method can include outputting the output of the evaluation having a fit label indicative of fit S108B. Further, the method 100 can include providing a personalized earpiece based on an output of the evaluation S110.

Figure 3:
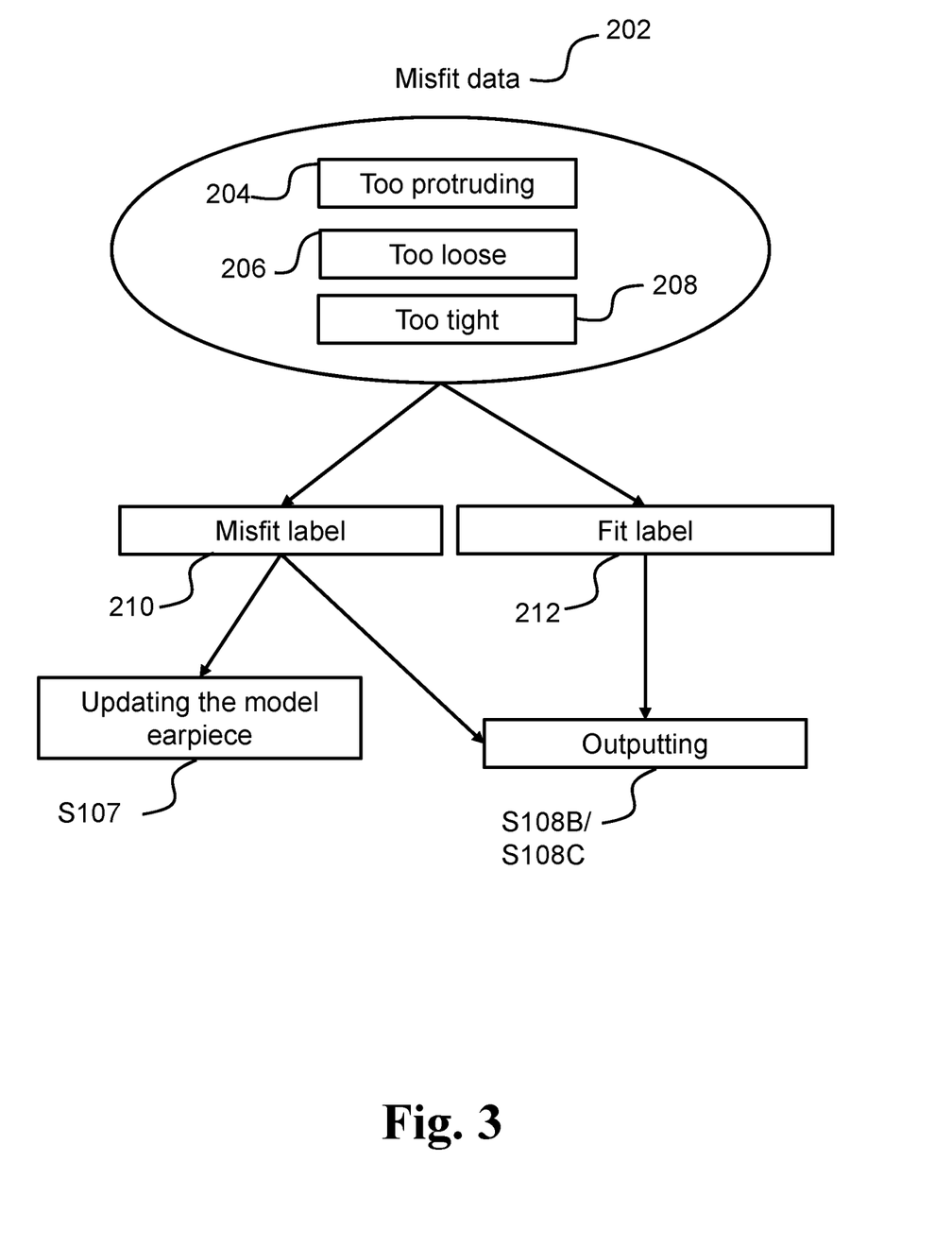
FIG. 3 illustrates example parameters which can be utilized in the methods of FIG. 1 and FIG. 2.

FIG. 3 illustrates an exemplary labelling for method 100 based on the determining S106. As mentioned above, the coupling data can include misfit data 202, having one or more misfit parameters. The one or more misfit parameters includes a first misfit parameter indicative of a first probability that the model earpiece is a misfit of a first type selected from too protruding 204, too tight 206, and too loose 208. Accordingly, as shown, the one or more misfit parameters includes a first misfit parameter indicative of a first probability that the model earpiece is too protruding 204; a second misfit parameter indicative of a second probability that the model earpiece is too tight 206; and a third misfit parameter indicative of a third probability that the model earpiece is too loose 208. The misfit parameters can be determined through machine learning, such as via a database of known earpieces, and compared to particular criterion.

If a particular misfit parameter meets a criterion, a misfit label indicative of misfit 210 can be added. For example, in accordance with a determination that a misfit label 210 is present, the method 100 can include outputting S108C the output of the evaluation having a misfit label indicative of misfit. If a particular misfit parameter does not meet a criterion, a fit label indicative of fit 212 can be added, or no label may be added. For example, in accordance with a determination that a misfit label 210 is not present, outputting S108B the output of the evaluation having a fit label indicative of fit 212.

In certain methods, if there are any misfit labels 210, the entire earpiece may be a misfit.

Accordingly, during the evaluating 108, the method 100 can determine whether a misfit label indicative of misfit 210 is present, and in accordance with a determination that a misfit label 210 is present, updating S107A the model earpiece to a secondary model earpiece. Following, the method 100 can include determining S107A secondary coupling data indicative of a coupling of the secondary model earpiece, the secondary coupling data including secondary misfit data including one or more secondary earpiece misfit parameters. The method 100 can proceed by evaluating S108 an earpiece configuration of the secondary model earpiece based on the secondary misfit data. Thus, the method 100 can be iterative and any number of different earpiece configurations can be evaluated.

In accordance with a determination that a fit label 212 is present, or no misfit label 210 is present, the method 100 can proceed to providing S110 the personalized earpiece based on an output of the evaluation of the secondary model earpiece.

Any or all of the above steps can be performed prior to providing an initial earpiece to the user. Thus, the first physical earpiece a user receives can be the personalize earpiece.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in the order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 100 method
S102 obtaining 3D scan data of an ear
S102A performing a 3D scan on an impression of the ear
S102B performing a 3D scan on the ear
S104 obtaining a model earpiece
S106 determining coupling data
S107 updating the model earpiece to a secondary model earpiece
S107A determining secondary coupling data
S108 evaluating the earpiece configuration
S108A misfit criteria check
S108B outputting the output of the evaluation having a fit label indicative of fit
S108C outputting the output of the evaluation having a misfit label indicative of misfit
S108D labelling the model earpiece with a misfit label indicative of misfit
S110 providing a personalized earpiece
202 misfit data
204 too protruding
206 too loose
208 too tight
210 misfit label
212 fit label

The invention claimed is:

1. A method of designing an earpiece for a user, the method comprising:
electronically obtaining 3D scan data of an ear;
electronically generating a model earpiece with an earpiece configuration based on the 3D scan data;
after the model earpiece is generated, electronically evaluating the model earpiece by a processing unit to determine whether the model earpiece is too protruding, too tight, or too loose for the user before an initial physical earpiece is provided to the user, wherein the processing unit is configured to perform a comparison between a misfit parameter for the model earpiece and reference misfit parameter for reference earpieces;
electronically determining, by the processing unit, information regarding a personalized earpiece based on the model earpiece and the misfit parameter; and
providing the information regarding the personalized earpiece for processing by a manufacturing entity, wherein the manufacturing entity is configured to produce the earpiece having a physical feature corresponding with the information regarding the personalized earpiece.

2. The method according to claim 1, further comprising labelling the model earpiece with a misfit label indicative of misfit if a misfit criterion is satisfied.

3. The method according to claim 1, wherein the misfit parameter
indicates whether the model earpiece is too protruding, is too tight, or is too loose.

4. The method according to claim 1, further comprising:
updating the model earpiece to a secondary model earpiece; and
evaluating the secondary model earpiece to determine one or more secondary misfit parameters.

5. The method according to claim 4, wherein the information regarding the personalized earpiece is based on a result from the act of evaluating the secondary model earpiece.

6. The method according to claim 1, further comprising providing an evaluation output including a fit label indicative of fit.

7. The method according to claim 1, further comprising providing an evaluation output including a misfit label indicative of misfit.

8. The method according to claim 1, wherein the method is performed prior to providing the initial physical earpiece or any other physical earpiece corresponding to the 3D scan data to the user.

9. The method according to claim 1, wherein the 3D scan data is based on a 3D scan of an impression of the ear.

10. The method according to claim 1, wherein the 3D scan data is based on a 3D scan of the ear.

11. The method according to claim 1, wherein the 3D scan data comprises front pinna data, back pinna data, and ear canal data.

12. The method according to claim 1, wherein the misfit parameter indicates one or more probabilities of misfit and/or fit of the model earpiece.

13. The method according to claim 1, wherein the misfit parameter comprises a probability value.

14. An electronic device for designing an earpiece, the electronic device comprising one or more processors, memory, and an interface, wherein the one or more processors are configured to:
electronically obtain 3D scan data of an ear of a user;
electronically generate a model earpiece with an earpiece configuration based on the 3D scan data;
after the model earpiece is generated, electronically evaluate the model earpiece to determine whether the model earpiece is too protruding, too tight, or too loose for the user before an initial physical earpiece is provided to the user, wherein the one or more processors are configured to perform a comparison between a misfit parameter for the model earpiece and reference misfit parameter for reference earpieces;
electronically determine information regarding a personalized earpiece the model earpiece and the misfit parameter; and
providing the information regarding the personalized earpiece for processing by a manufacturing entity, wherein the manufacturing entity is configured to produce the earpiece having a physical feature corresponding with the information regarding the personalized earpiece.

15. The electronic device according to claim 14, wherein the misfit parameter indicates one or more probabilities of misfit and/or fit of the model earpiece.

16. The electronic device according to claim 14, wherein the misfit parameter comprises a probability value.

\* \* \* \* \*